United States Patent
Tumblin

(10) Patent No.: US 11,354,413 B2
(45) Date of Patent: Jun. 7, 2022

(54) NON-DISRUPTIVE MITIGATION OF MALWARE ATTACKS

(71) Applicant: Digital Immunity LLC, Burlington, MA (US)

(72) Inventor: Henry R. Tumblin, Malden, MA (US)

(73) Assignee: Digital Immunity LLC, Burlington, MA (US)

( * ) Notice: Subject to any disclaimer, the term of this patent is extended or adjusted under 35 U.S.C. 154(b) by 216 days.

(21) Appl. No.: 16/553,398

(22) Filed: Aug. 28, 2019

(65) Prior Publication Data

US 2020/0074082 A1 Mar. 5, 2020

Related U.S. Application Data

(60) Provisional application No. 62/723,649, filed on Aug. 28, 2018.

(51) Int. Cl.
| | |
|---|---|
| *G06F 21/56* | (2013.01) |
| *G06F 21/55* | (2013.01) |
| *G06F 21/00* | (2013.01) |
| *G06F 12/1009* | (2016.01) |
| *G06F 11/30* | (2006.01) |

(52) U.S. Cl.
CPC .......... *G06F 21/566* (2013.01); *G06F 11/301* (2013.01); *G06F 12/1009* (2013.01); *G06F 21/561* (2013.01); *G06F 21/564* (2013.01); *G06F 21/568* (2013.01)

(58) Field of Classification Search
CPC .... G06F 21/566; G06F 21/561; G06F 21/568; G06F 21/564
See application file for complete search history.

(56) References Cited

U.S. PATENT DOCUMENTS

| | | | |
|---|---|---|---|
| 6,782,478 B1 | 8/2004 | Probert | |
| 8,958,546 B2 | 2/2015 | Probert | |
| 9,230,455 B2 | 1/2016 | Probert | |
| 9,602,289 B2 | 3/2017 | Probert | |
| 9,892,661 B2 | 2/2018 | Probert et al. | |
| 10,474,813 B1* | 11/2019 | Ismael | G06F 21/566 |
| 2015/0101048 A1* | 4/2015 | Sridhara | G06F 21/55 726/23 |
| 2015/0161383 A1 | 6/2015 | Chen et al. | |
| 2017/0126738 A1 | 5/2017 | Wilkerson et al. | |
| 2017/0272462 A1* | 9/2017 | Kraemer | G06F 21/52 |

(Continued)

OTHER PUBLICATIONS

Mohanta, A., & Saldanha, A. (2020). Code Injection, Process Hollowing, and API Hooking. In Malware Analysis and Detection Engineering (pp. 267-329). Apress, Berkeley, CA. (Year: 2020).*

(Continued)

*Primary Examiner* — Alexander Lagor
(74) *Attorney, Agent, or Firm* — Anderson Gorecki LLP

(57) ABSTRACT

A method and system for mitigating a malware attack are disclosed herein. A malware detection module iterates over a virtual memory address space associated with a process executing on a computer system. The malware detection module identifies a region of memory likely to be vulnerable to a malware attack. Responsive to identifying the region of memory, a thread hollowing module determines a specific process thread associated with the identified region of memory. The thread hollowing module renders the specific process thread inoperable.

20 Claims, 4 Drawing Sheets

(56) References Cited

U.S. PATENT DOCUMENTS

2017/0329973 A1* 11/2017 Landau ................. G06F 21/55
2019/0180031 A1*  6/2019 Boutnaru ............ G06F 12/1009

OTHER PUBLICATIONS

Zhang, J., Qin, Z., Yin, H., Ou, L., & Hu, Y. (Dec. 2016). IRMD: malware variant detection using opcode image recognition. In 2016 IEEE 22nd International Conference on Parallel and Distributed Systems (ICPADS) (pp. 1175-1180). IEEE. (Year: 2016).*
PCT International Application No. PCT/US2019/048481, The International Search Report and The Written Opinion, dated Nov. 18, 2019, 9 pages.

* cited by examiner

NON-DISRUPTIVE MITIGATION OF MALWARE ATTACKS

CROSS-REFERENCE TO RELATED APPLICATION

This application claims priority to U.S. Provisional Application Ser. No. 62/723,649, filed Aug. 28, 2018, which is hereby incorporated by reference in its entirety.

FIELD OF THE DISCLOSURE

The present disclosure generally relates to computer security and malware protection.

BACKGROUND

Code injection is a technique by which an attacker introduces (or "injects") malicious code into a vulnerable computer program and changes the course of execution. Code injection exploits bugs or flaws in a computer program triggered by forcing the program to process invalid or specially crafted data. Variants include buffer overflow attacks, script injection attacks, reflective dynamically-linked library (DLL) injection attacks, and heap spraying attacks. Code injection attacks may be packaged and distributed in malware or spread as computer viruses.

A heap spray attack is a type of malware attack whereby heap memory is sprayed by a series of non-operational machine instructions ("no-ops") that are followed by an executable portion of code. No-ops are computer instructions that do not define an operation, such as arithmetic operations with a zero operand. A sequence of no-ops instructions that are meant to "slide" a processor's instruction execution flow to a desired destination may be referred to as a no-op slide. The desired destination may include a transfer-of-control operation such as a return, jump, or call. The no-op slide may route the computer to executable code that causes the computer system to perform actions at the behest of the attacker, such as gaining root access.

One known technique for preventing the executing of malicious code is referred to as "DNA Mapping." DNA Mapping is a technique wherein sequences of opcodes and operands (invariants) are mapped to covert information (code words) so that code words are alternative representations of the sequence of invariants. These code words are associated with elements of a computer program. When the sequence of invariants is compared to the appropriate code word it can be verified that the sequence of invariants is in the proper order or that the program has been modified. Embodiments of DNA Mapping are described in U.S. Pat. No. 8,958,546, issued on Feb. 17, 2015, which is incorporated herein by reference in its entirety.

SUMMARY

A method of mitigating a malware attack is disclosed herein. A malware detection module iterates over a virtual memory address space associated with a process executing on a computer system. The malware detection module identifies a region of memory likely to be vulnerable to a malware attack. Responsive to identifying the region of memory, a thread hollowing module determines a specific process thread associated with the identified region of memory. The thread hollowing module renders the specific process thread inoperable.

In another embodiment, a system is disclosed herein. The system includes a processor and a memory. The memory has programming instructions stored thereon, which, when executed by the processor, performs one or more operations. The one or more operations include iterating, by a malware detection module, a virtual memory address space associated with a process executing on a computer system. The one or more operations further include identifying, by the malware detection module, a region of memory likely to be vulnerable to a malware attack. The one or more operations further include responsive to identifying the region of memory, determining, by a thread hollowing module, a specific process thread associated with the identified region of memory. The one or more operations further include rendering, by the thread hollowing module, the specific process thread inoperable.

In another embodiment, a non-transitory computer readable medium is disclosed herein. The non-transitory computer readable medium has instructions stored thereon, which, when executed by a processor, cause the processor to perform an operation. The operation includes iterating, by a malware detection module, a virtual memory address space associated with a process executing on a computer system. The operation further includes identifying, by the malware detection module, a region of memory likely to be vulnerable to a malware attack. The operation further includes responsive to identifying the region of memory, determining, by a thread hollowing module, a specific process thread associated with the identified region of memory. The operation further includes rendering, by the thread hollowing module, the specific process thread inoperable.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Embodiments of the present disclosure relate to systems and methods for mitigating the effects of malware attacks using a technique referred to as "thread hollowing." During execution, a computer program (or "process") may spawn multiple threads of execution ("threads"). Various techniques can be used to detect and confirm a malware attack against the process. In some embodiments, a technique referred to as "look-aside checks" (or simply "look-aside")

may be employed in response to certain triggering events occurring within the process, such as file input/output (IO) operations, process/thread-related operations, network IO operations, or registry operations. During a look-aside check, the process's virtual memory (VM) may be may be examined to identify regions or segments that are suspicious or vulnerable to a malware attack. Each of these memory regions may be scanned for malicious content using techniques disclosed herein. In some embodiments, DNA mapping may be used to confirm (i.e., determine with a high degree of certainty) that certain regions have been tampered with as a result of a malware attack. When a malware attack is detected/confirmed for a particular process, the processor's virtual memory can be analyzed to identify which of the process's threads was affected and then modify the process's memory in a strategic manner such that the affected thread terminates or otherwise becomes inoperable. Other threads within the same process can continue to execute uninterrupted. The disclosed systems and methods can entirely stop a malware attack on a running process without disrupting the process's normal or intended behavior. In contrast to existing systems, embodiments of the systems and methods disclosed herein can mitigate malware attacks without causing the application to terminate or requiring it to be relaunched. Some embodiments of present disclosure may be used within high-availability systems and applications including, for example, air traffic control systems, autonomous vehicles, and medical devices. The techniques described herein are generally applicable to many types of modern computing systems including Windows, Linux, macOS, Android, and iOS systems.

Figure 1:
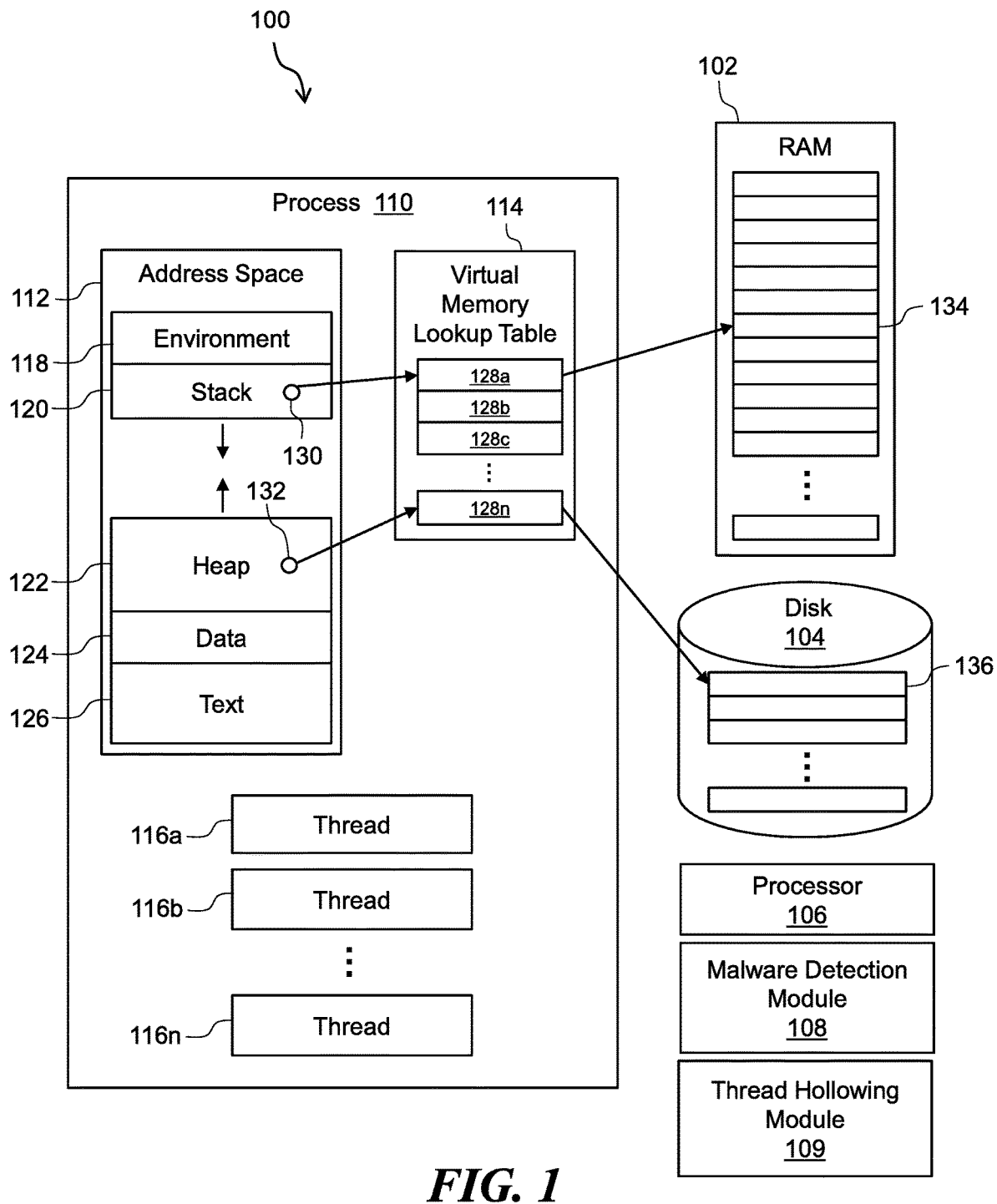
FIG. 1 is a diagram of an illustrative computer system configured for non-disruptive mitigation of malware attacks, according to some embodiments of the present disclosure.

FIG. 1 shows an example of computer system 100 configured for non-disruptive mitigation of malware attacks, according to some embodiments. The illustrative system 100 can include random access memory (RAM) 102, one or more disks 104, one or more processors 106, a malware detection module 110, and a thread hollowing module 108. The processor 106 can be configured to execute various computer programs processes. For explanation purposes, a single process 110 is shown in FIG. 1.

A process 110 running on the computer system 100 may be allocated various resources, e.g., by an operating system (OS). As shown in FIG. 1, a process can include or otherwise associated with an address space 112, a virtual memory (VM) lookup table 114, and one or more threads 116, 116b, . . . , 116n (116 generally). On Windows systems, the VM lookup table 114 may be referred to as a Virtual Address Descriptors (VAD) table. The process address space 112 can be partitioned into one or more segments or regions including segments for storing environment variables 118, one or more stacks 120, heap 122, program data 124 (e.g., static program data), and text 126 (e.g., executable program code).

The process address space 112 is mapped to physical memory in the form of, for example, RAM 102 or disk 104. The mapping from process memory to physical memory may be handled by a virtual memory manager (VMM) in the OS using the VM lookup table 114. For example, as illustrated in FIG. 1, a region 130 of the stack may be mapped to an entry 128a in VM lookup table 114, which in turn is mapped to a segment 134 of RAM. As another example, a region 132 of heap may be mapped to an entry 128n in the lookup table 114, which in turn is mapped to region 136 of disk 104. As discussed below in the context of FIG. 2, in some embodiments each thread 116 may be allocated its own stack 120. In general, a computer system 100 many have an arbitrary number of processes executing concurrently, each with an arbitrary number of threads.

Malware detection module 108 can be configured detect malware attacks within the computer system 100, including but not limited to buffer overflow attacks, script injection attacks, reflective DLL injection attacks, and heap spraying-based attacks. Module 108 can use various techniques to detect such attacks. In some embodiments, module 108 may perform a so-called "look-aside" check for each running process 100 in the computer system 100. During a look-aside check, module 108 may iterate over (or "walk through") the process' entire virtual memory address space looking for certain patterns or attributes that may be indicative of a malware attack or a vulnerability to such an attack. In some embodiments, module 108 may iterate through each entry 128a, 128b, 128c, . . . , 128n (128 generally) of the process' VM lookup table 114 and, for each entry 128, module 108 may analyze the corresponding physical memory region (e.g., within RAM 102 or on disk 104) to identify likely malware attack. Non-limiting examples of patterns or attributes that can be used to identify malware attacks include: regions (or "pages") of memory that have been dynamically relocated (e.g., using base relocation); regions of memory that include JavaScript, PowerShell scripts, batch scripts, or other types of scripts; regions of memory that include source for just-in-time compiled code (e.g., C#, visual basic (VB), python, and the like); regions of memory that are marked as executable; regions of memory that were dynamically linked or injected into memory (e.g., dynamically-linked libraries or (DLLs)); DLL-based regions of memory that do not have an associated file descriptor within the system 100; and regions of memory that include unusual patterns of non-operational machine instructions ("no-ops"), which can indicate a heap spray attach.

In some embodiments, malware detection module 108 can use one or more of the aforementioned techniques to identify regions of the process' memory that are more likely to be affected by a malware attack, and then use DNA Mapping or another technique to confirm that a malware attack has in fact occurred at one or more of those regions.

Thread hollowing module 109 can be configured to cooperate with malware detection module 108 to mitigate the risk of malware attacks. In particular, if malware detection module 108 identifies regions of memory that have been affected by a malware attacks, it can send information about that memory (e.g., memory address or location information) to thread hollowing module 109. In turn, thread hollowing module 109 can determine which specific process thread 116 was affected by the attack and render that thread inoperable by "hollowing out" the thread in memory. In some embodiments, module 109 can use the VM lookup table 114 to identify the affected thread, as discussed further below in conjunction with FIG. 2.

In some embodiments, thread hollowing module 109 may cause each region of affected memory to be overwritten with a series of no-ops. No-ops are computer instructions that do not define an operation, such as arithmetic operations with a zero operand. A sequence of no-ops instructions that are meant to "slide" a processor's instruction execution flow to a desired destination may be referred to as a no-op slide. The desired destination may include a transfer-of-control operation such as a return, jump, or call. Module 109 may also analyze the affected thread's stack and, as necessary to render the thread inoperable, inject a return operation or other control operation into the threads stack frame. In the case of script attacks, for example, the "no-op" may effectively overwrite with a space character in the proper encoding (e.g., ISO-xxxx) so that, when parsed, nothing usable is found.

Figure 2:
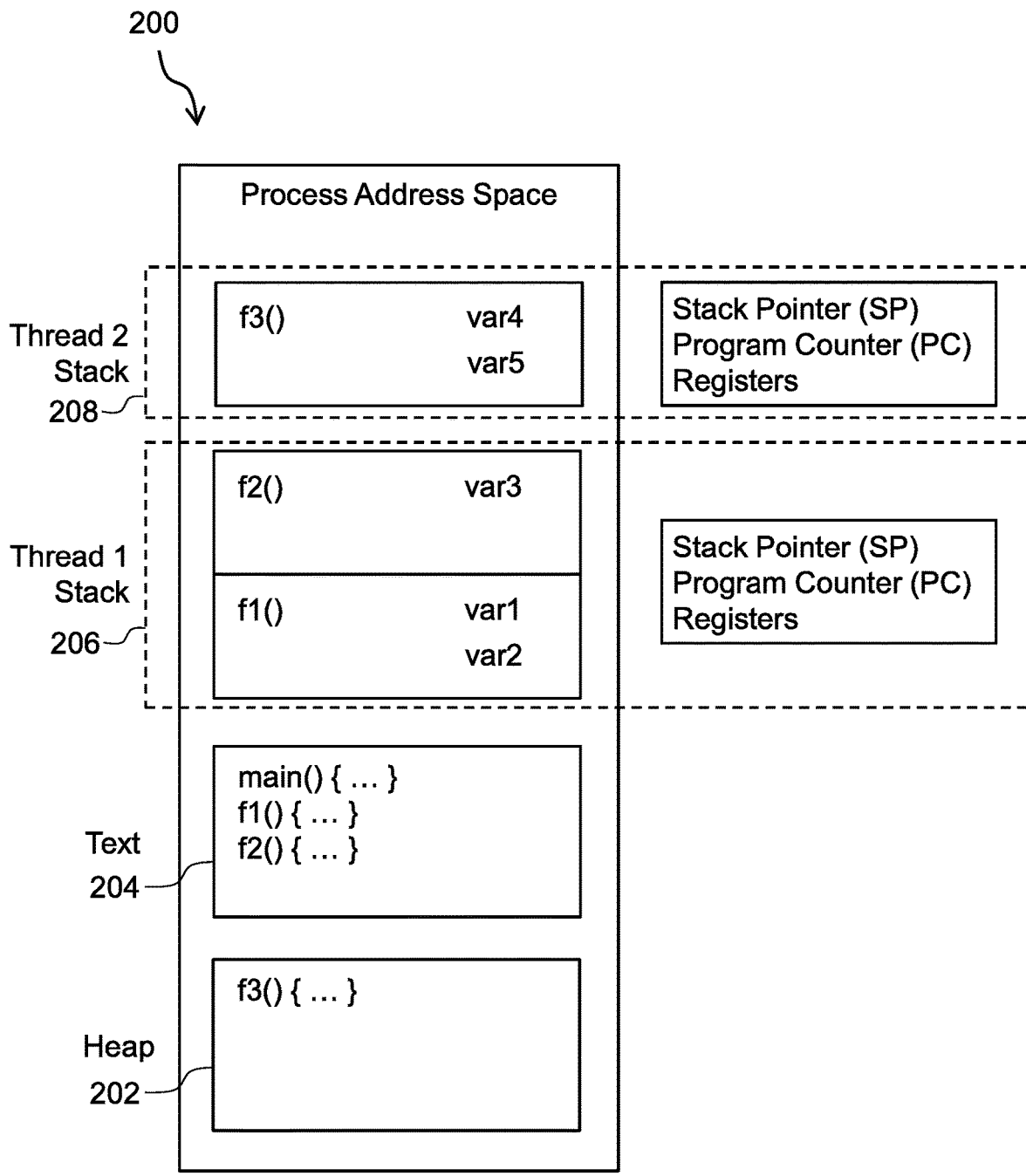
FIG. 2 is a diagram of illustrative process memory for multiple threads of execution, according to some embodiments of the present disclosure.

FIG. 2 shows an example of an address space 200 for a process having multiple threads of execution, such as for process 110 of FIG. 1. The illustrative address space 200 may include a heap segment 202, a text segment 204, a first stack segment 206 corresponding to a first thread ("Thread 1"), and a second stack segment 208 corresponding to a second thread ("Thread 2"). In this example, the process may be initially launched with functions "main," "f1," and "f2" as shown in text segment 204. As a result of a malware attack, a malicious function "f3" may be injected into the process's heap memory 202 and the second thread's stack 208 may be modified to call the malicious function "f3," as shown. Alternatively, "f3" could be a function loaded dynamically (e.g., via a DLL) and which has been modified as a result of malware (in which case the second thread's stack 208 need not be manipulated by the malware).

A processor or module can walk through the process address space 200 looking for regions of memory that have likely been affected by, or are vulnerable to, a malware attack. For example, referring to both FIGS. 1 and 2, malware detection module 108 can iterate through the VM lookup table 114 for the process and analyze each mapped segment of physical memory using heuristics discussed above in the context of FIG. 1. In the example of FIG. 2, malware detection module 108 could determine that the region of heap 202 where function "f3" is defined was affected by malware. Next, a processor or module can use thread hollowing to mitigate the malware attack in a non-disruptive manner. For example, referring to both FIGS. 1 and 2, thread hollowing module 109 can determine that the second thread ("Thread 2") was affected by the malware attack because the second thread's stack 208 includes a call to "f3." A skilled artisan will understand that other techniques may be used to identify specific threads affected by an in-memory malware attack. To mitigate the attack, thread hollowing module 109 may overwrite function "f3" in heap 202 with a series of no-ops. In some embodiments, module 109 may analyze the affected thread's stack 208 and, as necessary, inject a return operation or other control operation into the thread's stack frame 208.

Figure 3:
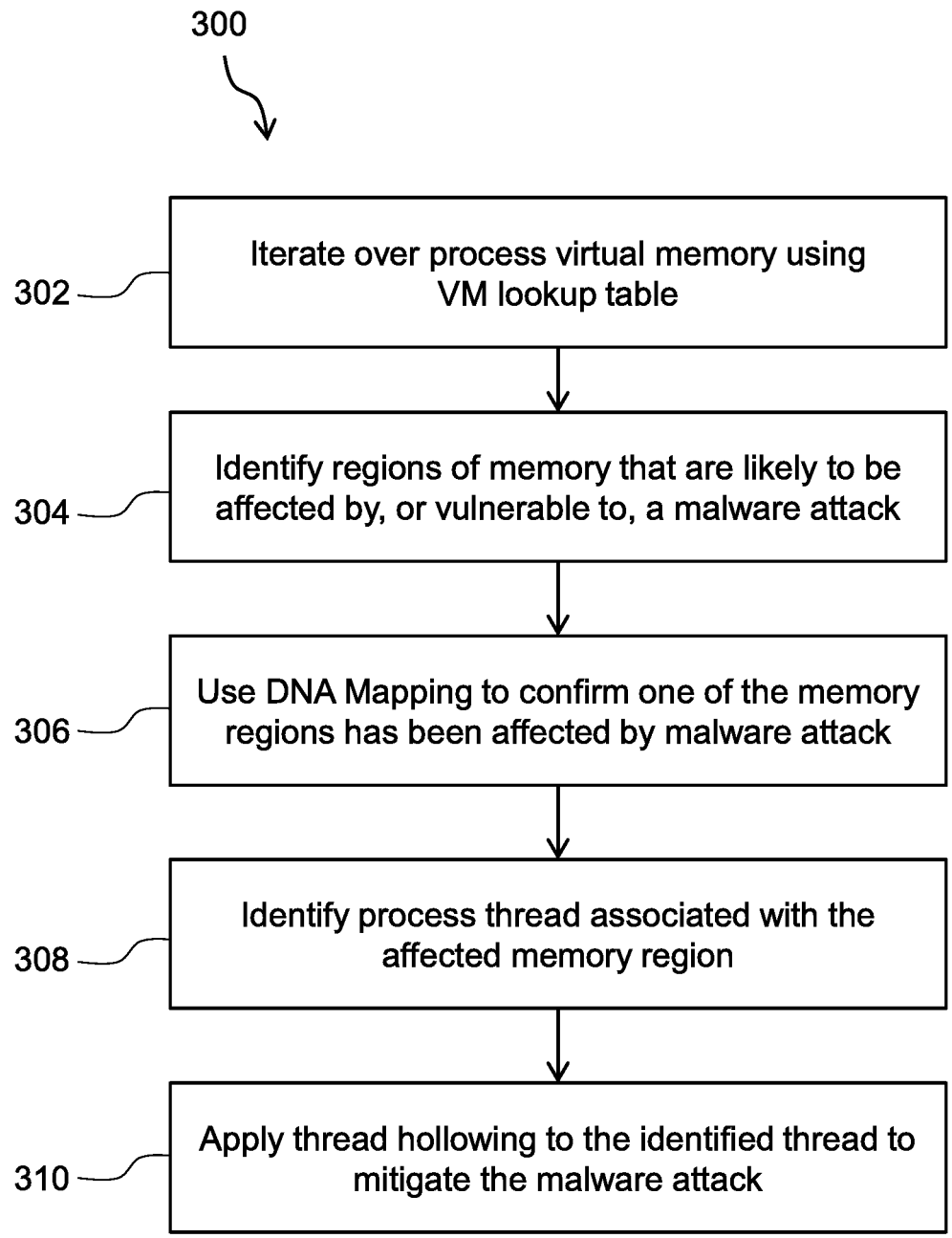
FIG. 3 is a flow diagram showing processing that may occur within the system of FIG. 1, according to some embodiments of the present disclosure.

Referring to FIG. 3, a method 300 may be used to mitigate malware attacks in a non-disruptive manner, according to some embodiments. At block 302, a process' virtual memory may be iterated over using the process VM lookup table. At block 304, one or more regions of memory that are likely to be affected by, or vulnerable to, a malware attack can be identified. In some embodiments, at block 306, DNA Mapping or other techniques can be used to confirm that at least one of the memory regions has in fact been affected by a malware attack. At block 308, a process thread associated with the affected memory region may be identified. At block 310, thread hollowing may be applied to the affected thread to mitigate the malware attack without requiring the process to terminate or be restarted.

Figure 4:
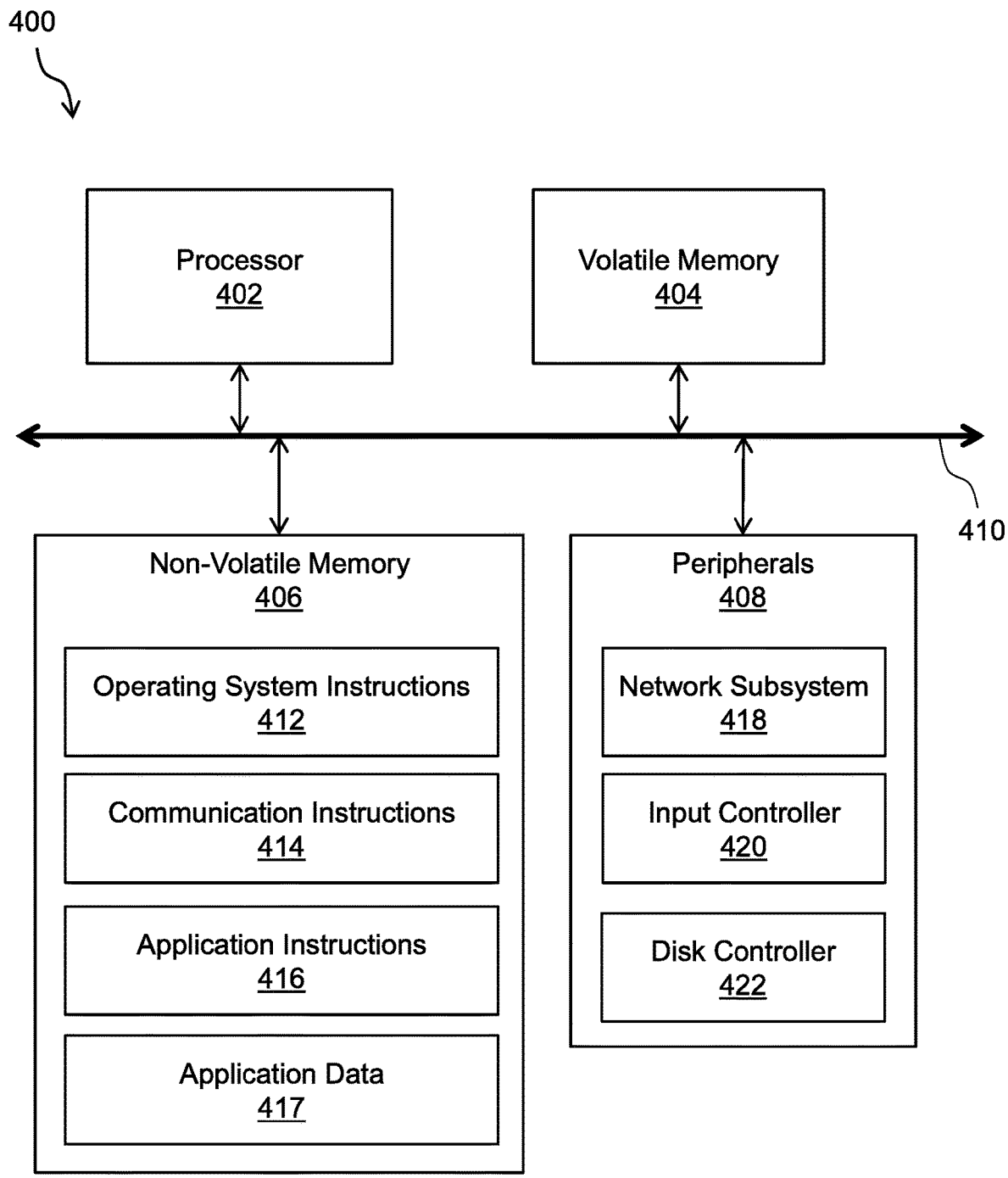
FIG. 4 is a block diagram of an illustrative computing device, according to some embodiments of the present disclosure.

FIG. 4 shows an illustrative computing device 400 that may implement various features and processes as described herein. The computing device 400 may be implemented on any electronic device that runs software applications derived from compiled instructions, including without limitation personal computers, servers, smart phones, media players, electronic tablets, game consoles, email devices, etc. In some implementations, the computing device 400 may include one or more processors 402, volatile memory 404, non-volatile memory 406, and one or more peripherals 408. These components may be interconnected by one or more computer buses 410.

Processor(s) 402 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 410 may be any known internal or external bus technology, including but not limited to ISA, EISA, PCI, PCI Express, NuBus, USB, Serial ATA or FireWire. Volatile memory 404 may include, for example, SDRAM. Processor 402 may receive instructions and data from a read-only memory or a random access memory or both. The essential elements of a computer may include a processor for executing instructions and one or more memories for storing instructions and data.

Non-volatile memory 406 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 406 may store various computer instructions including operating system instructions 412, communication instructions 414, application instructions 416, and application data 417. Operating system instructions 412 may include instructions for implementing an operating system (e.g., Mac OS®, Windows®, or Linux). The operating system may be multi-user, multiprocessing, multitasking, multithreading, real-time, and the like. Communication instructions 414 may include network communications instructions, for example, software for implementing communication protocols, such as TCP/IP, HTTP, Ethernet, telephony, etc. Application instructions 416 and data 417 can include computer instructions and data for mitigating malware attacks, such as described above in the context of FIGS. 1-3.

Peripherals 408 may be included within the computing device 400 or operatively coupled to communicate with the sever device 400. Peripherals 408 may include, for example, network interfaces 418, input devices 420, and storage devices 422. Network interfaces may include for example an Ethernet or WiFi adapter. Input devices 420 may be any known input device technology, including but not limited to a keyboard (including a virtual keyboard), mouse, track ball, and touch-sensitive pad or display. Storage devices 422 may include one or more mass storage devices for storing data files; such devices include magnetic disks, such as internal hard disks and removable disks; magneto-optical disks; and optical disks.

Methods described herein may represent processing that occurs within a system . . . (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed:

1. A method of mitigating a malware attack, comprising:
   iterating, by a malware detection module, a virtual memory address space associated with a computer system;
   identifying, by the malware detection module based on patterns of non-operational instructions (no-ops), a region of memory likely to be vulnerable to a malware attack;
   confirming, using DNA mapping, that the malware attack has occurred at the region of the memory;
   responsive to identifying the region of the memory and the confirming, determining, by a thread hollowing module, a first thread associated with the identified region of the memory; and
   rendering, by the thread hollowing module, the first thread inoperable.

2. The method of claim 1, wherein the region of the memory is associated with a second thread.

3. The method of claim 2, further comprising allowing, by the thread hollowing module, the second thread to continue to execute after the first thread has been rendered inoperable.

4. The method of claim 1, wherein iterating, by the malware detection module, the virtual memory address space, further comprises:
   iterating through each entry of a virtual memory lookup table; and
   for each entry, analyzing a corresponding physical memory region.

5. The method of claim 1, wherein identifying, by the malware detection module, the region of the memory likely to be vulnerable to the malware attack further comprises identifying:
   memory contents that have been dynamically relocated; memory contents that include scripts; memory contents that include source for just-in-time compiled code; memory contents that are marked as executable; memory contents that were dynamically linked or injected into memory; and dynamically-linked library-based regions of the memory that do not have an associated file descriptor.

6. The method of claim 1, wherein rendering, by the thread hollowing module, the first thread inoperable further comprises overwriting the identified region of the memory with a series of no-ops.

7. The method of claim 1, wherein rendering, by the thread hollowing module, the first thread inoperable comprises injecting a return operation or a control operation into a stack frame associated with the first thread.

8. A system, comprising:
   a processor; and
   a memory having programming instructions stored thereon, which, when executed by the processor, performs one or more operations comprising:
   iterating, by a malware detection module, a virtual memory address space associated with a computer system;
   identifying, by the malware detection module based on patterns of non-operational instructions (no-ops), a region of memory likely to be vulnerable to a malware attack;
   confirming, using DNA mapping, that the malware attack has occurred at the region of the memory;
   responsive to identifying the region of the memory and the confirming, determining, by a thread hollowing module, a first thread associated with the identified region of the memory; and rendering, by the thread hollowing module, the first thread inoperable.

9. The system of claim 8, wherein the region of the memory is associated with a second thread.

10. The system of claim 9, wherein the one or more operations further comprises allowing, by the thread hollowing module, the second thread to continue to execute after the first thread has been rendered inoperable.

11. The system of claim 8, wherein iterating, by the malware detection module, the virtual memory address space, further comprises:
   iterating through each entry of a virtual memory lookup table; and
   for each entry, analyzing a corresponding physical memory region.

12. The system of claim 8, wherein identifying, by the malware detection module, the region of the memory likely to be vulnerable to the malware attack further comprises:
   identifying memory contents that have been dynamically relocated; memory contents that include scripts; memory contents that include source for just-in-time compiled code; memory contents that are marked as executable; memory contents that were dynamically linked or injected into memory; and dynamically-linked library-based regions of the memory that do not have an associated file descriptor.

13. The system of claim 8, wherein rendering, by the thread hollowing module, the first thread inoperable further comprises overwriting the identified region of the memory with a series of no-ops.

14. The system of claim 8, wherein rendering, by the thread hollowing module, the first thread inoperable comprises injecting a return operation or a control operation into a stack frame associated with the first thread.

15. A non-transitory computer readable medium having instructions stored thereon, which, when executed by a processor, cause the processor to perform an operation, comprising:
   iterating, by a malware detection module, a virtual memory address space associated with a computer system;
   identifying, by the malware detection module based on patterns of non-operational instructions (no-ops), a region of memory likely to be vulnerable to a malware attack;
   confirming, using DNA mapping, that the malware attack has occurred at the region of the memory;
   responsive to identifying the region of the memory and the confirming, determining, by a thread hollowing module, a first thread associated with the identified region of the memory; and
   rendering, by the thread hollowing module, the first thread inoperable.

16. The non-transitory computer readable medium of claim 15, wherein the region of the memory is associated with a second thread.

17. The non-transitory computer readable medium of claim 16, further comprising allowing, by the thread hollowing module, the second thread to continue to execute after the first thread has been rendered inoperable.

18. The non-transitory computer readable medium of claim 15, wherein iterating, by the malware detection module, the virtual memory address space, further comprises:
   iterating through each entry of a lookup table; and
   for each entry, analyzing a corresponding physical memory region.

19. The non-transitory computer readable medium of claim 15, wherein identifying, by the malware detection module, the region of the memory likely to be vulnerable to the malware attack further comprises identifying:
   memory contents that have been dynamically relocated; memory contents that include scripts; memory contents that include source for just-in-time compiled code; memory contents that are marked as executable; memory contents that were dynamically linked or injected into memory; and dynamically-linked library-based regions of the memory that do not have an associated file descriptor.

20. The non-transitory computer readable medium of claim 15, wherein rendering, by the thread hollowing module, the first thread inoperable comprises overwriting the identified region of the memory with a series of no-ops.

\* \* \* \* \*